(12) United States Patent
Ramamoorthi et al.

(10) Patent No.: US 11,336,482 B2
(45) Date of Patent: May 17, 2022

(54) POLICY-DRIVEN ON-DEMAND TUNNEL CREATION/DELETION BASED ON TRAFFIC INFORMATION IN A WIDE AREA NETWORK (WAN)

(71) Applicant: Juniper Networks, Inc., Sunnyvale, CA (US)

(72) Inventors: Sankar Ramamoorthi, San Jose, CA (US); Ravi Shekhar, Sunnyvale, CA (US); Venkata Rajasekharu Athreyapurapu, Bangalore (IN); Rajeev Gupta, Bangalore (IN); Kaushik Dutta Majumdar, Bangalore (IN); Mohan Kumar A P, Bangalore (IN); Pranav Koushik, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/369,330

(22) Filed: Mar. 29, 2019

(65) Prior Publication Data

US 2020/0252234 A1 Aug. 6, 2020

Related U.S. Application Data

(60) Provisional application No. 62/799,621, filed on Jan. 31, 2019.

(51) Int. Cl.
*H04L 12/28* (2006.01)
*H04L 12/46* (2006.01)
(Continued)

(52) U.S. Cl.
CPC ...... *H04L 12/2859* (2013.01); *H04L 12/4641* (2013.01); *H04L 45/22* (2013.01); *H04L 45/64* (2013.01); *H04L 2012/6432* (2013.01)

(58) Field of Classification Search
CPC . H04L 12/2859; H04L 12/4641; H04L 45/22; H04L 45/64; H04L 2012/6432
See application file for complete search history.

(56) References Cited

U.S. PATENT DOCUMENTS

| 8,438,269 B1 | 5/2013 | West, III |
| 8,442,052 B1 | 5/2013 | Hughes |

(Continued)

FOREIGN PATENT DOCUMENTS

| EP | 3435599 A1 | 1/2019 |
| WO | 2013/184846 A1 | 12/2013 |

OTHER PUBLICATIONS

"EANTC Independent Test Report," Juniper Contrail SD-WAN Solution, Sep. 2018, 14 pp.

(Continued)

*Primary Examiner* — Kevin C. Harper
*Assistant Examiner* — Derrick V Rose
(74) *Attorney, Agent, or Firm* — Shumaker & Sieffert, P.A.

(57) ABSTRACT

Techniques are described for policy driven on-demand tunnel creation and deletion between end points in a software-defined wide area network (SD-WAN) having a hub-and-spoke topology. A software-defined networking (SDN) controller that facilitates cloud-based services of a service provider network that sets up the SD-WAN is configured to determine whether a tunnel between end-points is to be created or deleted based on information indicative of the traffic, such as amount, time, application generating the traffic, and the like, between end-points.

20 Claims, 4 Drawing Sheets

(51) Int. Cl.
*H04L 12/715* (2013.01)
*H04L 12/707* (2013.01)
*H04L 45/00* (2022.01)
*H04L 45/64* (2022.01)
*H04L 12/64* (2006.01)

(56) References Cited

U.S. PATENT DOCUMENTS

| | | | |
|---|---|---|---|
| 9,577,943 | B1 | 2/2017 | Bhandarkar |
| 10,637,721 | B2 | 4/2020 | Hughes et al. |
| 11,129,023 | B2 | 9/2021 | Olofsson et al. |
| 2014/0362686 | A1* | 12/2014 | Jogalekar ............... H04L 45/12 370/229 |
| 2015/0109967 | A1 | 4/2015 | Hogan et al. |
| 2015/0124622 | A1 | 5/2015 | Kovvali et al. |
| 2016/0028608 | A1 | 1/2016 | Dasgupta |
| 2016/0080251 | A1 | 3/2016 | Ramachandran et al. |
| 2016/0205029 | A1* | 7/2016 | Sugunadass ......... H04L 43/0882 370/236 |
| 2017/0026417 | A1 | 1/2017 | Ermagan et al. |
| 2017/0099188 | A1* | 4/2017 | Chang .................... H04L 63/20 |
| 2017/0207976 | A1* | 7/2017 | Rovner ............... H04L 43/0882 |
| 2018/0013584 | A1 | 1/2018 | Shen et al. |
| 2018/0181423 | A1 | 6/2018 | Gunda et al. |
| 2018/0270118 | A1 | 9/2018 | Lee et al. |
| 2018/0295180 | A1 | 10/2018 | Yang et al. |
| 2019/0158605 | A1* | 5/2019 | Markuze ............... H04L 69/162 |
| 2019/0190819 | A1* | 6/2019 | Choudhury ......... H04L 47/2441 |
| 2019/0207844 | A1* | 7/2019 | Kodavanty ............ H04L 41/20 |
| 2019/0274070 | A1* | 9/2019 | Hughes ............... H04L 47/2441 |
| 2019/0288875 | A1 | 9/2019 | Shen et al. |
| 2020/0092209 | A1* | 3/2020 | Chen ...................... H04L 45/64 |
| 2020/0389796 | A1 | 12/2020 | Olofsson et al. |

OTHER PUBLICATIONS

"SLA Profiles and SD-WAN Policies Overview," Juniper Networks, Aug. 21, 2018, 6 pp.

Extended Search Report from counterpart European Application 19181832.7 dated Nov. 5, 2019, 8 pp.

"Contrail SD-WAN and SD-LAN—Design and Architecture Guide", Juniper Networks, Inc., Retrieved from https://www.juniper.net/documentation/en_US/release-independent/solutions/information-products/pathway-pages/sg-007-sd-wan-sd-lan-design-arch-guide.html, modified Aug. 8, 2019, 126 pp.

U.S. Appl. No. 16/548,658, filed Aug. 22, 2019, naming inventors Nithyananda K S et al.

"Application Quality of Experience (AppQoE)" TechLibrary, Juniper Networks, Inc., Sep. 27, 2018, available at https://www.juniper.net/documentation/en_US/junos/topics/topic-map/security-appqoe.html accessed Nov. 1, 2018, 23 pp.

U.S. Appl. No. 16/191,075, filed Nov. 14, 2018, naming inventors Hemachandran K M et al.

Sathyanarayan et al. "Auto Discovery VPN Protocol" draft-sathyanarayan-ipsecmeadvpn-03, available at https://datatracker.ietf.org/meeting/88/materials/slides-88-ipsecme-3 (last accessed Mar. 7, 2019), Nov. 4, 2013, 17 pp.

"Contrail SDWAN Design & Architecture Guide", Juniper Networks, Inc., 2018, available at https://www.juniper.net/documentation/en_US/release-independent/solutions/information-products/pathway-pages/sg-007-contrail-sd-wan-design-architecture.pdf, last accessed Mar. 27, 2019, 46 pp.

"Connect the Enterprise and Multicloud With Secure SD-WAN" Juniper Networks, Inc., Nov. 2018, available at https://www.juniper.net/assets/us/en/local/pdf/solutionbriefs/3510624-en.pdf, last accessed Mar. 29, 2019, 6 pp.

Response filed Feb. 2, 2021 to the Extended Search Report from counterpart European Application 19181832.7 dated Nov. 5, 2019, 19 pp.

Response to the Examination Report dated Apr. 8, 2021 from counterpart European Application 19181832.7, filed Aug. 3, 2021, 13 pp.

Examination Report from counterpart European Application 19181832.7 dated Apr. 8, 2021, 3 pp.

* cited by examiner

POLICY-DRIVEN ON-DEMAND TUNNEL CREATION/DELETION BASED ON TRAFFIC INFORMATION IN A WIDE AREA NETWORK (WAN)

This application claims the benefit of U.S. Provisional Patent Application No. 62/799,621 filed on Jan. 31, 2019, the entire contents of which is incorporated herein by reference.

TECHNICAL FIELD

The disclosure relates to the routing of packets within a network, and more particularly, to route management within a wide area network (WAN).

BACKGROUND

A computer network includes a number of devices, such as computers, that are interconnected by network infrastructure. In some cases, these devices are grouped into a number of site networks implemented as local area networks (LAN), which in turn may be geographically distributed over a wide area and interconnected by a wide area network (WAN).

In a hub-and-spokes topology, a hub operates to facilitate communication between spoke site networks. Some configurations of the hub-and-spokes topology pass all data through a hub, isolating the spoke site networks, and allowing communication between devices within different spoke site networks only through the hub.

SUMMARY

In general, techniques are described for policy driven on-demand tunnel creation and deletion between end points in a software-defined wide area network (SD-WAN) having a hub-and-spoke topology. In the SD-WAN, communication between spoke site networks is facilitated by the hub which, in the case of the SD-WAN, may be provided by a hub device. The hub device communicates with spoke devices at spoke site networks through a network service provider. As described herein, a software-defined network (SDN) controller may be leveraged and configured to provide policy-driven, on-demand tunnel creation and deletion between the end points of the hub-and-spoke SD-WAN, thereby allowing communications to bypass the hub device. The hub device may be located in various portions in the SD-WAN such as at the service provider, at a location other than that of the service provider and a customer premises, and/or at the customer premises. When located at the customer premises, the hub device may be considered as a tenant hub device because the hub device is a hub device for the tenant.

The tunnel creation and deletion may be based on various key performance indicators (KPIs) such as information indicative of the traffic (e.g., type of traffic) between end points in the hub-and-spoke network. The SDN controller may determine whether a tunnel should be created or deleted between two end points (e.g., spoke devices for respective spoke site networks) based on the KPIs. In this manner, rather than creating a full mesh of tunnels so that each end point has a communication tunnel to all other end points, the SDN controller can determine whether a tunnel between two end points is needed based on the KPIs and create the tunnel based on the determination. For instance, there is no need for an a priori full tunnel mesh between the end points, and specific tunnels between specific end points can be configured on-demand.

The techniques may provide one or more technical advantages having at least one practical application. For example, eschewing a full mesh of tunnels to transport traffic among site networks communicating across the WAN may reduce tunnel configuration and resource overhead on the spoke devices by enabling fewer than the full mesh of N×N tunnels, where N is the number of site networks, while still allowing for direct site-to-site communication. As another example, faster deployment of service may be realized because the example techniques may allow a site network to be functional in much shorter time than would otherwise be required when peering the site network with a hub device to reach other site networks. As another example, the techniques may allow for heterogeneous types of end-devices by allowing for a mix of devices to be deployed as end-devices.

In one example, the disclosure describes A method of communicating in a software-defined wide area network (SD-WAN) configured in a hub-and-spoke topology, the method comprising in the hub-and-spoke topology, where each of a plurality of spoke devices are configured with an overlay tunnel to a corresponding one of a plurality of hub devices such that a first spoke device configured with a tunnel to a first hub device communicates with a second spoke device configured with a tunnel to a second hub device via a first path through the first hub device and the second hub device, determining, with a software-defined networking (SDN) controller facilitating SD-WAN services across the SD-WAN, information indicative of traffic flowing between the first and second spoke devices via the first path, determining, with the SDN controller, that a second path for communicating between the first spoke device and the second spoke device is to be configured based on the determined information, wherein the second path bypasses at least one of the first hub device and the second hub device, and configuring, with the SDN controller and in response to the determination, parameters required for the second path between the first spoke device and the second spoke device through the SD-WAN that bypasses at least one of the first hub device and the second hub device.

In one example, the disclosure describes a software-defined wide area network (SD-WAN) configured in a hub-and-spoke topology comprising a plurality of hub devices, a plurality of spoke devices configured with an overlay tunnel to corresponding one of the plurality of hub devices such that a first spoke device configured with a tunnel to a first hub device communicates with a second spoke device configured with a tunnel to a second hub device via a first path through the first hub device and the second hub device, and a software-defined networking (SDN) controller facilitating SD-WAN services across the SD-WAN, wherein the SDN controller is configured to determine information indicative of traffic flowing between the first and second spoke devices via the first path, determine that a second path for communicating between the first spoke device and the second spoke device is to be configured based on the determined information, wherein the second path bypasses at least one of the first hub device and the second hub device, and configure, in response to the determination, parameters required for the second path between the first spoke device and the second spoke device through the SD-WAN that bypasses at least one of the first hub device and the second hub device.

In one example, the disclosure describes A service provider for a software-defined area network (SD-WAN) arranged in a hub-and-spoke topology, the service provider comprising a software-defined networking (SDN) controller communicatively coupled to a plurality of spoke devices in the hub-and-spoke topology, wherein the SDN controller is configured to facilitate SD-WAN services across the SD-WAN, wherein the plurality of spoke devices are configured with an overlay tunnel to a corresponding one of a plurality of hub devices such that a first spoke device configured with a tunnel to a first hub device communicates with a second spoke device configured with a tunnel to a second hub device via a first path through the first hub device and the second hub device, and wherein the SDN controller is configured to determine information indicative of traffic flowing between the first and second spoke devices via the first path, determine that a second path for communicating between the first spoke device and the second spoke device is to be configured based on the determined information, wherein the second path bypasses at least one of the first hub device and the second hub device, and configure, in response to the determination, parameters required for the second path between the first spoke device and the second spoke device through the SD-WAN that bypasses at least one of the first hub device and the second hub device.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1A:
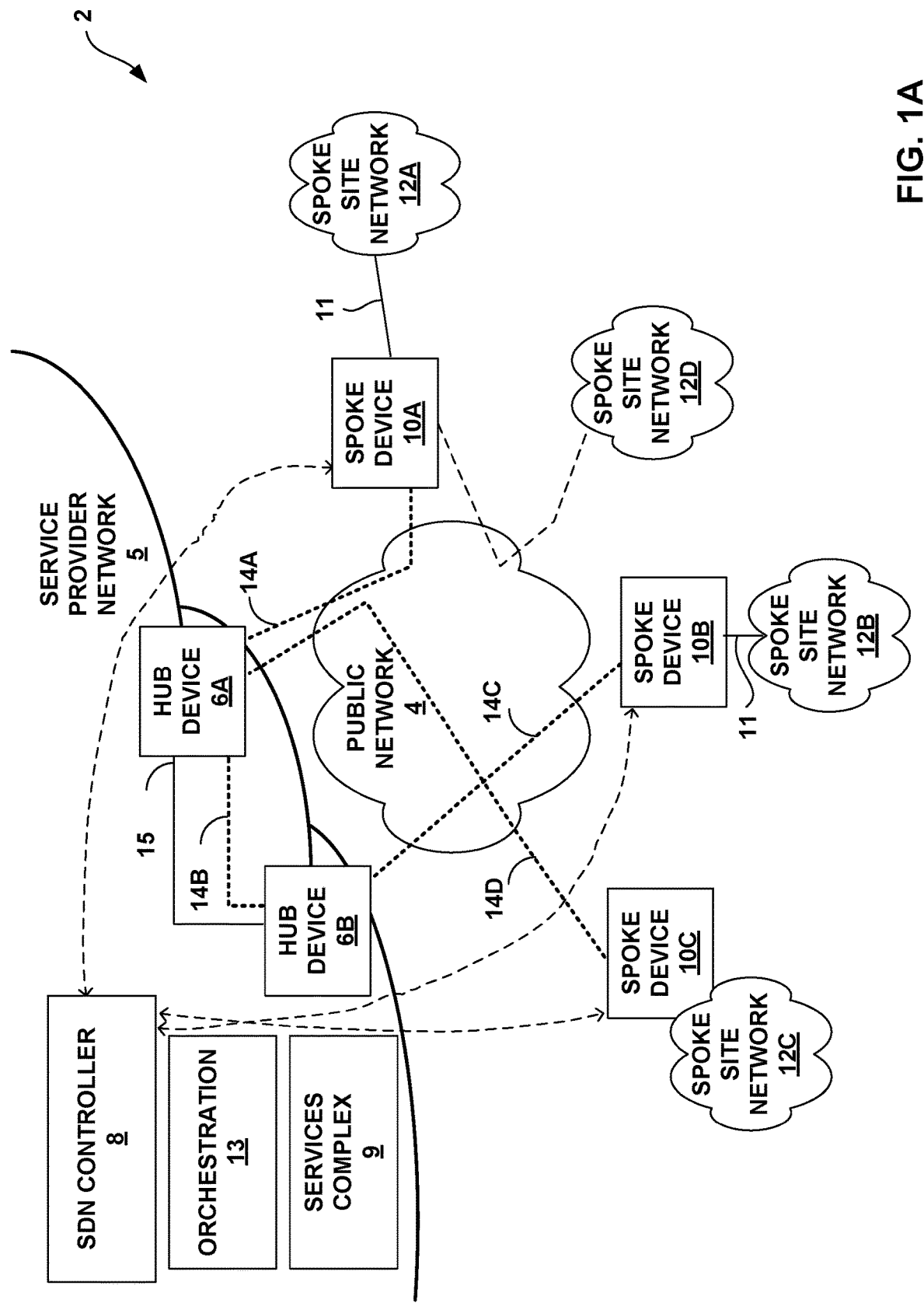
FIGS. 1A and 1B are block diagrams illustrating example network configured in a hub-and-spokes topology.
Figure 1B:
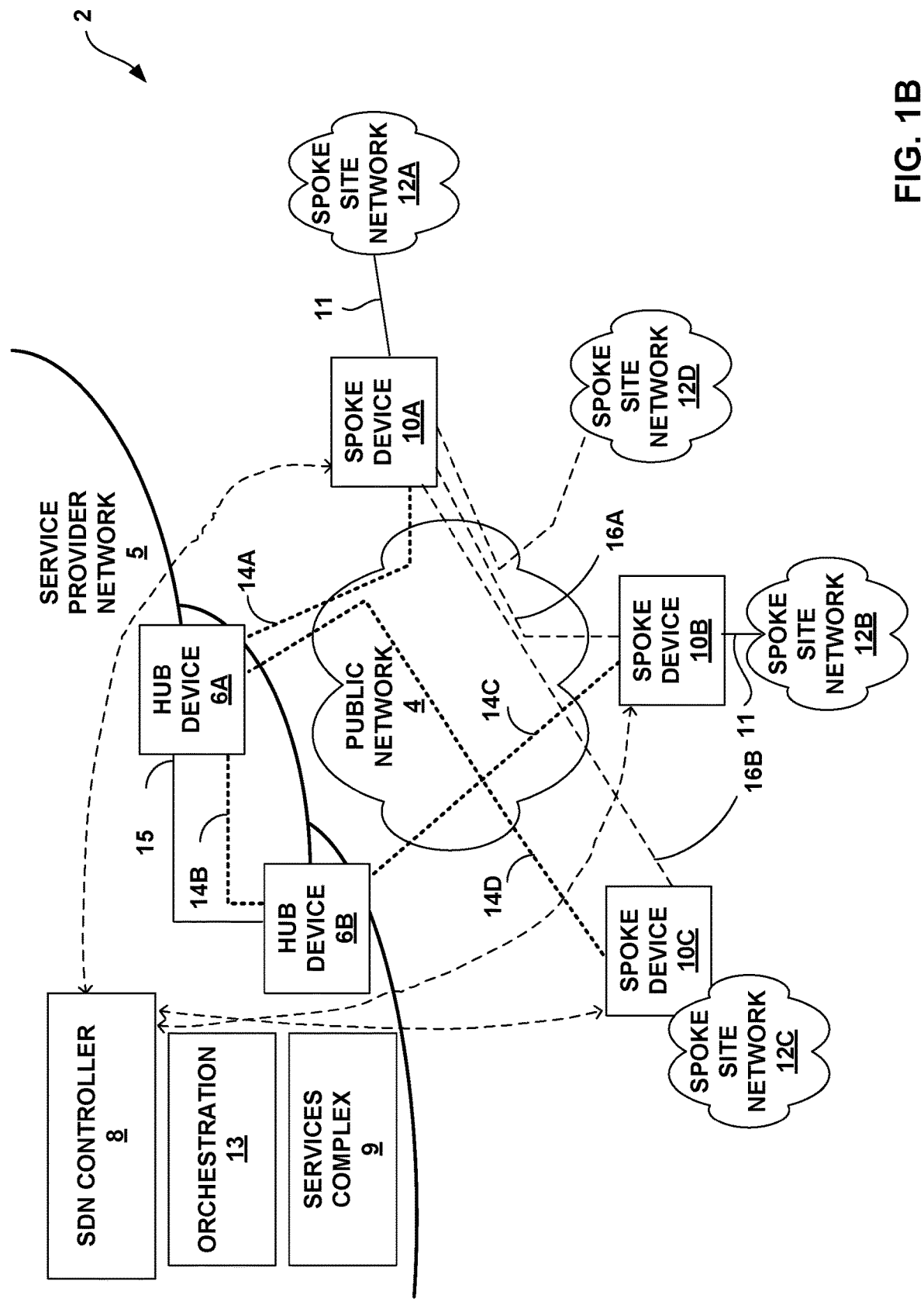

FIGS. 1A and 1B are block diagrams illustrating an example network 2 (e.g., wide area network (WAN)) configured in a hub-and-spoke topology. Network 2 may be a software-defined (SD) WAN (SD-WAN). As described herein, network 2 is configured to operate as a dynamic virtual private network (DVPN) in which tunnels are dynamically created and deleted between spoke sites in a centrally managed, policy-driven manner.

Network 2 includes spoke site networks 12A-12D ("spoke site networks 12") connected to a public network 4. Spoke site networks 12 may be geographically-distributed sites of an enterprise, sites of different enterprises, service provider (e.g., XaaS) sites, other types of sites, or a combination thereof. Although network 2 may include any number of spoke site networks 12, FIGS. 1A and 1B, for simplicity, show only spoke site networks 12A-12D.

As illustrated, network 2 includes service provider network 5. Service provider network 5 operates as a private network to provide packet-based network services to spoke site networks 12. Service provider network 5 in this example instance also operates to provide cloud-based services to one or more customers (e.g., hub connectivity and/or spoke connectivity over private network), such as customers at spoke site networks 12. As illustrated, service provider network 5 includes software-defined networking (SDN) controller 8, orchestration engine 13, and includes services complex 9. However, service provider network 5 including SDN controller 8 is one non-limiting example. In some examples, SDN controller 8 may be a distributed controller that executes at least in part at spoke site networks 12 (e.g., may have agents executing at spoke set networks 12) or within customer data centers (public or private) as a few examples. SDN controller 8 may represent a SD-WAN controller that configures hub devices 6 and spoke devices 10 to form one or more overlay tunnels through service provider network 5 and/or public network 4 to enable communications between pairs of tunnel endpoints using an overlay tunnel.

In the example illustrated in FIGS. 1A and 1B, tunnels 14, described in more detail below, are configured to carry communication between spoke devices 10. As illustrated, tunnels 14 are shown as traversing public network 4. In some examples, tunnels 14 may traverse through service provider network 5 and not public network 4. Also, although hub devices 6 are illustrated as being part of service provider network 5, the example techniques are not so limited. In some examples, hub devices 6 may reside elsewhere and use public network 4 and/or service provider network 5 to communicate with spoke devices 10 through respective tunnels 14. As one example, one or more of hub devices 6 may reside at customer premises. In such example, hub devices 6 residing at customer premises may be considered as being tenant site hub devices because hub devices 6 are hub devices for the tenant.

The example techniques described in this disclosure may be applicable to the various ways in which network 2 is configured. In general, the example techniques may be applicable where two spoke devices 10 are initially configured to communicate through one or more of hub devices 6. SDN controller 8, based on policy metrics, determines whether one or more hub devices 6 should be bypassed so that a direct tunnel (e.g., tunnels 16 in FIG. 1B and described in more detail below) between two spoke devices 10 is configured. In some examples, the direct tunnels between spoke devices 10 may traverse service provider network 5 and/or public network 4 but bypass (e.g., not traverse) one or more hub devices 6.

An enterprise may be a tenant within one or more customer data centers, and SDN controller 8 may execute within these one or more customer data centers. As another example, an enterprise, rather than having its own customer data center (e.g., private cloud) may utilize a public data center (e.g., public cloud). SDN controller 8 may execute in the public cloud. Accordingly, SDN controller 8 may execute in a data center of service provider network 5, in a private cloud, and/or in a public cloud.

Orchestration engine 13 manages application-layer functions for spoke site networks 12 such as managing compute, storage, networking, and application resources executing within data centers supported by service provider network 5. For instance, some applications may not execute locally at customer equipment connected to spoke site networks 12, and orchestration engine 13 may ensure that these applications execute within the cloud (e.g., servers of a data center with which service provide network 5 provides access to spoke site networks 12). In this way, service provider network 5 is configured to provide cloud-based services to spoke site networks 12.

As further examples, service provider network 5 includes services complex 9. Services complex 9 provides an execution environment for network services. As one example, services complex 9 includes nodes that apply one or more services. Examples of the services include firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic.

Service provider network 5 also includes a software-defined networking (SDN) controller 8. SDN controller 8 provides a logically, and in some cases, physically centralized controller for facilitating operations, such as the cloud-based services, of service provider network 5 for implementing network 2 (e.g., SD-WAN). As one example, network 2 is an overlay tenant network. For instance, SDN controller 8 may be configured to configure tunnels between spoke site networks 12 (e.g., via respective spoke devices 10 and hub devices 6, as described in more detail). In this way, SDN controller 8 facilitates communication through SD-WAN (e.g., network 2). As described in more detail below, SDN controller 8 may be configured to determine in a policy driven manner whether to dynamically create (e.g., configure) tunnels between spoke devices 10 to bypass routing traffic through one or more hub devices 6. SDN controller 8 may also be configured to determine in a policy driven manner whether to dynamically delete tunnels between spoke devices 10 and cause traffic between spoke devices 10 to be routed through one or more hub devices 6.

Public network 4 may include one or more autonomous systems (not shown) and may represent the Internet. Public network 4 may include a number of devices (not shown), such as routers and switches, used to route packets from point to point across public network 4. The enterprise associated with network 2 may utilize public network 4 to route packets between geographically distributed site networks 12.

Each of spoke site networks 12 may include one or more devices (not shown), such as personal computers, laptop computers, handheld computers, workstations, servers, routers, switches, printers, fax machines, or the like. Each of spoke site networks 12 may include one or more Local Area Networks (LANs) (not shown).

As shown in FIGS. 1A and 1B, spoke site networks 12 may be connected to public network 4 via spoke devices 10A-10C ("spoke devices 10"). Spoke devices 10 may be located at respective spoke site networks 12 but are shown separately to ease with illustration. In some examples, spoke devices 10 may be off-premises relative to spoke site networks 12.

Spoke site networks 12 may be considered to be edge networks of public network 4 (e.g., tenant overlay network). Examples of spoke devices 10 may include the NFX series of router devices from Juniper. As one example, spoke devices 10 may execute the SRX series of software from Juniper. As one example, spoke devices 10 may execute the vSRX virtual firewall software from Juniper. Spoke devices 10 may be a gateway router (GWR) providing connectivity from spoke site networks 12 to other sites in network 2 and to public network 4. In another example, spoke devices 10 may be present behind a network address translation (NAT) device.

For example, spoke site network 12C may be an infrastructure as a service (IaaS) or a platform as a service (PaaS) executing in a public cloud. In this example, spoke device 10C may be a vSRX that functions like an endpoint and ensures that secure access is established with the applications executing in the public cloud (e.g., cloud-native applications). In some examples, an endpoint may not be required for the public cloud such as in spoke site network 12D where spoke site network 12D provides a software as a service (SaaS) (e.g., Salesforce, gSuite, Office 365). As illustrated, spoke site network 12D is coupled to spoke device 10A for access to service provider 5.

Hub devices 6A and 6B may be considered as edge routers within service provider network 5. Examples of hub devices 6A and 6B include the MX series WAN hubs and SRX series WAN hubs from Juniper. Each of hub devices 6A and 6B may be a gateway, such as an SD-WAN gateway, and may terminate MPLSoGRE, MPLSoMPLS, MPLSoUDP, IPSec, or other overlay tunnels with spoke devices 10.

Hub devices 6A and 6B and spoke devices 10A-10C may be administered by the entity, e.g., the service provider of service provider network 5, that provides network services to the enterprise that includes spoke site networks 12. Spoke devices 10 may be coupled to customer premises equipment (CPE) and in some examples may include the CPE, as spoke devices 10 may reside at customer's premises. In some examples, the CPE may be hosted on a modem, such as a digital subscriber line (DSL) modem.

Each of spoke site networks 12 may, as shown in FIGS. 1A and 1B, connect to public network 4 via one of spoke devices 10, or may be connected to public network 4 via multiple spoke devices 10. For simplicity, FIGS. 1A and 1B show only spoke site networks 12 connected to public network 4 via spoke devices 10 but the techniques are not so limited.

Each of spoke site networks 12 may be connected to spoke devices 10A-10C, via one or more access links 11. Furthermore, hub devices 6 may connect to gateway devices of service provider network 5 via one or more physical or logical interfaces (not shown) of hub devices 6 and spoke devices 10 may connect to gateway devices and to public network 4 via one or more physical or logical interfaces (not shown) of spoke devices 10. Network interface cards of hub devices 6 and spoke devices 10 may provide the physical or logical interfaces. Each access link 11 may correspond to a physical or logical interface of devices 6 and 10.

In certain deployment scenarios, it is desirable to deploy a software-defined wide area network (SD-WAN) solution in a full mesh topology. In a full mesh topology, spoke site networks 12 connect to each other via direct overlay tunnels thereby conserving the network bandwidth in the underlay network. For example, in a full mesh topology, each one of spoke devices 10 would have a tunnel to all other spoke devices 10 without needing to go through respective hub devices 6. Overlay tunnel could be IPSec, GRE, MPLS over GRE, IPSec over MPLS over GRE, MPLS over MPLS, or any other form where the underlay network is not aware of the payload that it is carrying and as a result the internal header forwarding requirements.

In some of these scenarios that form a full mesh topology, SDN controller 8 (e.g., central controller or CSO) is configured to configure the full mesh tunnels by configuring each site with overlay tunnels to all other sites. In such cases, the number of such tunnels created are O(N) on each site, and SDN controller 8 would have to create such tunnels for every end-point—thereby having a provisioning and monitoring computation of $O(N^2)$. Each site also has a redundant connection to all other sites by creating multiple tunnels, say a factor of k—typically from 2 to 9.

There may be technical problems with having a full-mesh, such as in an SD-WAN such as network 2. As one example, in an SD-WAN, communication flows through a public network, such as the Internet. Therefore, additional overhead is needed to ensure secure transmission, as compared to routing within a data center, where a public network is not needed. This additional overhead may be in the form of the communication tunnels being IPsec tunnels, or other communication tunnels with higher levels of security (e.g., secure tunnels). In an SD-WAN, rather than compute nodes at spoke site networks 12 executing virtual router/switch such as those within data centers, compute nodes at spoke site networks 12 may be executing vSRX, which provides firewall capabilities, from Juniper Networks along with routing and switching (e.g., spoke devices 10 are an example of virtual routers and/or switches with vSRX firewalls).

Configuring secure tunnels, like IPSec tunnels, or utilizing routers and firewalls to form a full mesh topology may be computationally and memory wise expensive in examples if a relatively large number of spoke site networks 12 or spoke devices 10. For example, assume there are 10,000 spoke devices 10, and in full mesh, the compute nodes at spoke site networks 12 may need to have sufficient computational resources to maintain at least 9999 communication tunnels (e.g., one tunnel to each other one of spoke site networks 12 assuming no redundant tunnels). Even if spoke devices 10 are capable of handling 9999 communication tunnels (e.g., an SD-WAN secure path such as through IPSec although the techniques are not so limited), the compute nodes (e.g., at SDN controller 8 or at customer premises) may not provide enough computational resources to manage 9999 communication tunnels, slowing down the operation of spoke devices 10, especially in examples where spoke devices 10 include firewall capabilities of vSRX.

Accordingly, in examples where SD-WAN secure paths (e.g., IPSec or other path types with higher security than paths such as those internal to a data center) are used, there may be a technical problem with configuring a full-mesh topology. Therefore, rather than there being a full-mesh, spoke devices 10 may communicate with one other via one or more hub devices 6. Although example techniques are described with respect to SD-WAN secure paths, the example techniques are not limited to examples where SD-WAN secure paths are required and may be extended to examples where other path types are used.

However, there may be times when a tunnel (e.g., path in network 2) between to spoke devices 10 is desirable. This disclosure describes examples of software-defined networking (SDN) controller 8 that provides a policy-driven manner in which to determine whether a path is to be configured through an overlay of network 2 that should be established that bypasses at least one of hub devices 6 that spoke devices 10 were using to communicate with one another. In this manner, SDN controller 8 may provide for an on-demand path (e.g., SD-WAN secure path as one non-limiting example) between spoke devices when certain policy criteria are satisfied. Moreover, in some examples, SDN controller 8 may define the policy such that only certain types of data are transmitted and received on the new on-demand created path while other types are transmitted and received through the original path through hub devices 6.

SDN controller 8 may be a software-defined networking (SDN) controller executing on programmable hardware (e.g., programmable processing circuitry) including a general purpose computer. However, SDN controller 8 may be a hardware component (e.g., fixed-function processing circuitry), or a combination of software and hardware (e.g., combination of programmable and fixed-function processing circuitry).

SDN controller 8 may execute in a cloud-environment setup by service provider network 5. In the cloud-environment, one or more servers execute SDN controller 8. The one or more servers may be located in a data center, and the data center may include a router (e.g., gateway router) that provide connection to public network 4. In some examples, the one or more servers that execute SDN controller 8 may be located in the same location as one or more of spoke site networks 12. For example, SDN controller 8 may execute on customer premises. SDN controller 8 may be a distributed controller and therefore portions of SDN controller 8 may execute at various different locations within network 2 (e.g., the SD-WAN). In this disclosure, when SDN controller 8 is described as performing the example operations, it should be understood that the programmable hardware (e.g., general purpose computer processor or specialized processing circuit) on which SDN controller 8 executes is performing the example operations in examples where SDN controller 8 is software executing on programmable hardware.

As described above, SDN controller 8 is configured to form tunnels (e.g., paths) on-demand rather than having a static configuration of tunnels that form a full-mesh. As also described above, there may be technical problems with such a full-mesh (e.g., huge configuration or monitoring of tunnels) that relies on a static configuration (e.g., not on-demand of creation or deletion of tunnels).

The static configuration of tunnels results in two forms of scaling issues. At end-points, each one of spoke devices 10 needs to support for $O(k.N)$ tunnels statically created ahead of time—including support for configuring such tunnels, and keeping them up via signaling protocol. As described above, compute nodes of spoke devices 10 may not have sufficient computation resources to support $O(k \ldots N)$ tunnels. There may also be computation overhead issues with SDN controller 8.

At SDN controller 8, SDN controller 8 may need computation overhead to support $O(k.N^2)$ overlay tunnels. Initially, when there may not be too many spoke devices 10, the overhead may be minimal. However, as more spoke devices 10 are provisioned, the overhead may become too large because the additional tunnels is $O(k.N)$ where N is the number of spoke devices 10.

The time it takes SDN controller 8 to bring up a new end-point by having to create a tunnel to every other device before its activation may be significant. Also, creation of tunnel may require SDN controller 8 to configure both ends of the tunnel—at the newly on boarded end-point, and at every other end-point in the network to create a tunnel to the newly on-boarded end-point to allow a full mesh topology.

That is, one of the roles of SDN controller 8 is to form tunnels between spoke devices 10. During operation, routers, switches, and/or firewalls executing on spoke devices 10 spin up or shut down often (e.g., new spoke devices 10 may need to be provisioned or removed), and therefore, in a full mesh topology, every time a new spoke device 10 is provisioned, SDN controller 8 may need to form tunnels between the new spoke device 10 and all other spoke devices 10. Creation of such tunnels every time new spoke device 10 is provisioned (e.g., a router, switch, and/or firewall executing on spoke device 10 spins up) requires time and delays when communication can start with the spoke device 10, even where the new spoke device 10 may communicate with a limited number of spoke devices 10.

This disclosure describes example techniques to reduce the computation and scaling overhead that SDN controller 8 may need to perform. In particular, the full-mesh of tunnels are not needed a-priori and SDN controller 8 can create the tunnels (e.g., paths) dynamically on demand (e.g., only when the characteristics of traffic warrant a direct tunnel between a pair of end-points such as spoke devices 10). There is always a default path available to forward the traffic between a pair of end-devices via use of a single or multiple hubs (e.g., even if there is not a direct tunnel between two devices 10, there is a path through respective hubs 6).

In accordance with one or more examples described in this disclosure, the end-devices (e.g., spoke devices 10) are connected to one or more hub devices 6 in a hub-and-spoke fashion. The connection to hub devices 6 may require a minimal amount of configuration on the end-device (e.g., spoke devices 10) at the time of on boarding. SDN controller 8 may be configured to create a shortcut tunnels on-demand after on boarding of the end-device. In the meantime, the traffic between end-devices flow through hub devices 6.

For example, in FIG. 1A, for spoke device 10A to communicate with spoke device 10B, spoke device 10A communicates via tunnel 14A with hub device 6A, hub device 6A communicate via tunnel 14B with hub device 6B, and hub device 6B communicates with spoke device 10B via tunnel 14C, and vice-versa. Similarly, as illustrated, spoke device 10C communicates via tunnel 14D to hub device 6A to further communicate with the other spoke routers. Tunnels 14 may be overlay tunnels to couple spoke devices 10 to corresponding one of hub devices 6. Examples of tunnels 14 are SD-WAN secure paths such as IPSec paths that may be configured through dedicated MPLS, broadband Internet, wireless 4G/LTE, and legacy/DSL interconnect. Additional examples of tunnels 14 include secure paths such as PPP links, ATM links, Ethernet links, Frame Relay link, GRE tunnels, IPSec tunnels, MPLS over GRE tunnels, IPSec over MPLS over GRE tunnels, MPLS over MPLS tunnels, or the like.

There may be a hardwired connection between hub devices 6A and 6B, in some examples, as illustrated with connection link 15. This may be initial network configuration where all spoke devices 10 are on boarded and two or more spoke devices 10 need to communicate with another one of spoke devices 10 via one or more hub devices 6. Accordingly, FIG. 1A illustrates an example of a SD-WAN configured in a hub-and-spoke topology, where the hub-and-spoke topology includes a plurality of hub devices, and a plurality of spoke devices coupled to (e.g., configured with an overlay tunnel 14A to) a corresponding one of the plurality of hub devices such that a first spoke device (e.g., device 10A) coupled to (e.g., configured with a tunnel to) a first hub device (e.g., hub device 6A) communicates with a second spoke device (e.g., device 10B) coupled to (e.g., configured with a tunnel to) a second hub device (e.g., hub device 6B) via a first path (e.g., tunnel 14A which may be secure tunnel through the first hub device (e.g., hub device 10A) and the second hub device (e.g., hub device 6B)).

In some examples, SDN controller 8 may determine that there should be a communication tunnel between spoke device 10A and spoke device 10B. For example, SDN controller 8 may determine information indicative of traffic flowing between the first and second spoke devices via the first path (e.g., type of traffic, amount of traffic, timing of when traffic started and ended, which application generated the traffic, and the like that is flowing via tunnel 14A). As one example, controller 8 may monitor the traffic between devices 10 to determine information indicative of the traffic flowing between device 10A and device 10B. As another example, each one of devices 10 (or possibly the customer equipment) may monitor their own traffic and output information indicative of the traffic to SDN controller 8. In such examples, to determine the information indicative of the traffic, SDN controller 8 receives the information indicative of the traffic. SDN controller 8 receiving information from devices 10 that is indicative of the traffic includes examples where devices 10 monitor the traffic or examples where devices 10 output information of the traffic that is monitored by the customer equipment (e.g., laptops and the like).

SDN controller 8 may determine that a second path for communicating between the first spoke device and the second spoke device is to be configured based on the received information. In one or more examples, the second path bypasses at least one of the first hub device and the second hub device. For instance, the second path bypasses both the first hub device and the second hub device. Bypassing one or more hub devices 6 may speed the routing of traffic because fewer components are used to route, and there may be less burden on hub devices 6, which can speed the transfer of other traffic.

An example of a second path bypassing at least one of the first and second hub devices is illustrated in FIG. 1B. SDN controller 8 may configure parameters required to form a tunnel 16A and/or tunnel 16B, through the hardware underlay, as described in more detail with respect to FIG. 2 that allows for communication between spoke device 10A and spoke device 10B (e.g., via tunnel 16A) and for communication between spoke device 10C and spoke device 10A (e.g., via tunnel 16B) without needing to go through a plurality of hub devices 6, and in some cases, without needing to go through any of hub devices 6.

Data that is to be transmitted by one of spoke devices 10 and received by another one of spoke devices 10 need not necessarily (and in general does not) travel through SDN controller 8. In some examples, SDN controller 8 may not be configured to intercept data packets, forward data packets, or otherwise form a conduit for the transmission or reception of data packets. For example, SDN controller 8 may be configured to receive the information indicative of traffic flowing between the first and second spoke devices (e.g., devices 10A and 10B), and not route traffic between the first and second spoke devices.

Although SDN controller 8 may not be part of a tunnel, SDN controller 8 may be configured to utilize key performance indicators (KPIs) to determine whether tunnels should be dynamically created or deleted. For example, SDN controller 8 may be configured to implement a policy, where the policy defines criteria for whether SDN controller 8 forms a tunnel (e.g., path) between spoke devices 10. In other words, the tunnel creation between a pair of end-devices may be expressed as a policy. The following are non-limiting examples of what the policy could cover. The example policies could be used together or individually.

The policy may define that SDN controller 8 is to create a path (e.g., SD-WAN secure path such as shortcut IPSec tunnel where none or fewer hub devices 6 are needed) between any two CPEs (customer premises equipment) (e.g., spoke devices 10) whenever first data-packet exchange happens between them or a certain bandwidth has been exceeded (e.g., after 10 gigabytes of data transfer). The policy may define that SDN controller 8 is to create a path between two CPE devices (e.g., spoke devices 10) if there is an exchange of time-sensitive application traffic like voice. The policy may define that SDN controller 8 is to create a path when there is a long-lived bandwidth extensive traffic being transmitted like backup or video conferencing traffic between sites. The policy may define that SDN controller 8 is to create a path if the forwarding traffic via one or more hub devices 6 is failing to meet SLA requirements. In some examples, the policy may conflict with existing implementation of choosing the best path based on SLA requirements such as where the best path is based on which spoke devices 10 are communicating with one another.

As some additional examples, the policy may define that SDN controller 8 is to create a path for data traffic between two spoke devices 10 from 9 am to 5 pm on Monday through Friday. All other traffic, such as web browsing, may go through hub devices 6. On Saturdays, backup data traffic may pass through the path (e.g., shortcut tunnel through underlay between two spoke devices 10 that bypasses one or more hub devices 6 that were being used for communication between the two spoke devices 10) and other data may pass through hub devices 6.

A user, such as an administrator, may define the policy. In some examples, SDN controller 8 may be configured to define the policy. For example, SDN controller 8 may monitor characteristics of network 2, such as when data is communicated between spoke devices 10, between which spoke devices 10 data is communicated, how much data is communicated between spoke devices 10, and the like to determine a policy. As one example, SDN controller 8 may determine that certain type of traffic is high for certain time periods between two spoke devices 10. SDN controller 8 may define a policy that during the time periods if traffic of the certain type is greater than a threshold number of bytes or packets, that a path is to form between the two spoke devices 10 that bypasses hub devices 6 so that there is a shortcut for data of the certain type. All other data types may flow through one or more of hub devices 6 so as to prioritize the data of the certain type. However, it is possible that all other data types also utilize the shortcut path that bypasses hub devices 6.

In some examples, the policy for tearing down (e.g., deleting) of tunnels can similarly be expressed when one or more of these conditions are not met. The tear down can be done in a relatively straight forward manner as long as the involved CPEs (e.g., spoke devices 10) still have room to create additional new IPSec tunnels (e.g., SD-WAN secure paths) for future traffic.

There may be additional advantages that may be realized utilizing the techniques described in this disclosure. As one example, faster deployment of service may be realized because the example techniques may allow a site to be functional in much shorter time than by peering it with one of hub devices 6. Also, techniques may allow for heterogeneous types of end-devices by allowing for a mix of devices to be deployed as end-devices. Each type of end-device may have a different number of tunnels that it can support simultaneously. For instance, each of spoke devices 10 may have different numbers of SD-WAN secure paths to other spoke devices 10 that bypass hub devices 6.

SDN controller 8 takes the capability of the end-device into account and creates only as many shortcut tunnels as a given type of end-device functionally allows. For instance, as described above, compute nodes may not have sufficient computational resources to manage all tunnels needed for a full mesh. SDN controller 8 may be configured to account for the computational resources of the compute nodes so that the number of tunnels a compute node needs to manage are within the computation capabilities of the compute node.

Moreover, the techniques may provide a more holistic control of the network. SDN controller 8 can learn/predict the communication pattern between the end-nodes (and possibly the load on the intermediate nodes) to create/tear down overlay tunnels. SDN controller 8 can also prioritize communication between a given set of end-nodes over end-nodes outside that set, for instance all the end-nodes that are on the north-American subcontinent compared to cross Atlantic nodes. Such grouping of end-devices to prioritize tunnel creation is termed as end-device mesh-groups. For instance, there may be SD-WAN secure tunnels (e.g., shortcut tunnels that bypass hub devices 6) between spoke devices 10 that are within North America but not between spoke devices 10 in North America and Europe.

Even though the dynamic creation of tunnel is orchestrated by SDN controller 8, data needed by SDN controller 8 to determine whether to create or delete a tunnel can be measured or determined in a distributed manner at the end-devices. This allows SDN controller 8 to scale the dynamic creation of tunnels to large number of end-devices and traffic flows.

The following is non-limiting examples of data that is measured in distributed manner is as follows. Trigger for traffic flows done on the end-devices (as opposed to hub). Use of Agents/Micro-service/Daemon on the end-devices to filter and summarize the data-triggers of interest (e.g., KPIs) to SDN controller 8. Alternatively, end-device could natively support expressing interesting traffic flows in the form of policy.

While SDN controller 8 configures the parameters required for overlay tunnel creation, the signaling to bring up the tunnel is done by the end-device itself—for instance, in case of IPSec, this may be IKE protocol. Decision to divert of the traffic from the tunnel towards the hub device 6 to the shortcut tunnel (e.g., newly created path) towards the egress end-spoke once it is up (e.g., a new one of spoke devices 10 that is spun up), and corresponding changes required in the route-table in order to divert the traffic to use that tunnel may be performed at the end-spokes (e.g., by spoke devices 10).

For instance, in some examples, SDN controller 8 may be configured to monitor traffic between spoke devices 10 and determine whether a policy metric is satisfied (e.g., by comparing traffic information such as amount of traffic, type of traffic, sender of traffic, receiver of traffic, and the like to policy metrics). If the policy metric is satisfied, SDN controller 8 may determine that tunnels 16A and 16B of FIG. 1B are to be configured.

However, in some examples, rather than SDN controller 8 monitoring all traffic, it may be possible to distribute monitoring functionalities to the CPEs (e.g., spoke devices 10 or the devices coupled to spoke devices 10). SDN controller 8 may output information to spoke devices 10 that define certain criteria. In such examples, spoke devices 10 may output information indicative of the traffic to SDN controller 8, but only when the certain criteria is satisfied. In such examples, SDN controller 8 may then determine whether a tunnel (e.g., SD-WAN secure path) is to be dynamically configured.

As an example, SDN controller 8 may instruct device 10A to indicate when device 10A has outputted more than 10 gigabytes of data within a certain time period to device 10B. In this example, SDN controller 8 may not keep monitoring the traffic flowing from device 10A. However, when device 10A determines that device 10A has outputted more than 10 gigabytes of data to device 10B, device 10A may output information indicative of the traffic flowing from device 10A (e.g., 10 gigabytes of data has been transmitted to device 10B). In this example, controller 8 may receive the information indicative of the traffic flowing between device 10A and device 10B and compare the information to a policy metric. As one example, the policy metric may indicate that after device 10A transmits 10 gigabytes of data to device 10B, a tunnel should be dynamically configured between device 10A and device 10B that bypasses one or more of hub devices 6A and 6B.

Accordingly, at least one of the first or second spoke devices may be configured to determine whether one or more policy metrics are satisfied, determine information indicative of traffic flowing between the first and second spoke devices based on the determination of whether the one or more policy metrics are satisfied, and transmit, to SDN controller 8, the determined information indicative of the traffic flowing between the first and second spoke devices. In some examples, at least one of the first or second spoke devices may be configured to form the second path (e.g., tunnel 16A or tunnel 16B). For instance, while SDN controller 8 may configure the parameters required for overlay tunnel creation, devices 10 may be configured to bring up the tunnel (e.g., in case of IPsec, spoke devices 10 may use a IKE protocol).

Moreover, in some examples, spoke devices 10 may be configured to determine when to use the dynamically created tunnel versus when to go through hub devices 6. For example, at least one of the first or second spoke device may determine that the first spoke device and the second spoke device are to communicate via the second path and update a routing table to route traffic through the second path. In such examples, the first and second spoke devices are configured to communicate traffic between the first and second spoke devices based on the updated routing table.

For spoke devices 10 to communicate with one another, spoke devices 10 may need the Internet protocol (IP) addresses of other devices 10 with which devices 10 are to communicate. Some techniques rely upon a pool of addresses and dynamically assign addresses to devices 10. However, such dynamically allocation can be complicated and can be prone to errors.

In some examples, each of spoke devices 10 may be assigned a unique identifier. Spoke devices 10 may form tunnels to other ones of devices 10 based on the respective unique identifiers.

SDN controller 8 may determine the unique identifier based at least in part on a site identification and a wide area network (WAN) interface name/number to determine the unique identifier. In this way, no dynamic allocation of addresses is needed, and each of devices 10 may be assigned their own unique identifier. The unique identifier may be based on a unique number allocated to site network 12 and unique number allocated to the WAN-link of site network 12.

Accordingly, this disclosure describes a hybrid approach to overcome the limitations associated with the prior full-mesh solution where shortcut IPSec tunnels are created between all pairs of spoke devices 10. As described above, such full-mesh solutions have long provisioning times for to bring up a new spoke device 10, and could only support smaller number of spoke devices 10 in a mesh (<50).

In one or more of the examples described in this disclosure, the example techniques rely on a minimal initial configuration for spoke devices 10. For example, spoke devices 10 are initially spun up to communicate with other spoke devices 10 via hub devices 6, so that direct tunnels between all spoke devices 10 is not needed because it is enough to route traffic via hub devices 6. SDN controller 8 may facilitate later creating overlay tunnels between a site pair (e.g., pair of spoke devices 10) only if traffic is flowing between those sites and in some examples, only if (a certain type of).

In this manner, spoke devices 10 may be functional in much shorter time. Also, the compute nodes are protected (e.g., computational resources of the compute nodes on which spoke devices 10 execute such as vSRX are not overly burdened) by limiting the number of overlay tunnels that are created on it without significant degradation in performance.

The techniques described in this disclosure may be considered as Dynamic VPN-DVPN. DVPN can also use policies to delete overlay tunnels between a site pair if traffic between them falls below a certain threshold. This will ensure that device do not keep the tunnels up where not needed, and instead use tunnels for the sites that see more traffic.

Some other techniques may form tunnels between spoke devices 10 but these other techniques created tunnels between two spoke devices 10 in response to any communication between spoke devices 10. However, in such techniques, any probe traffic between spoke devices 10 would trigger IPSec tunnel establishment. That is, even if there is not going to be long periods of transmission and reception of data, in these other techniques, an IPSec tunnel would be configured between two spoke devices 10. Such determination would be done in hub devices 6 and not an SDN controller (like SDN controller 8) that facilitates cloud-based operations for a service provider (like service provider 5), as described in this disclosure.

In accordance with the techniques described in this disclosure, SDN controller 8 utilizes controller-based analytics. For example, SDN controller 8 may utilize a policy driven algorithm to determine whether shortcut SD-WAN secure paths are to be configured beyond two devices Moreover, the monitoring of the traffic may be done by the endpoints (e.g., spoke devices 10) which minimizes the monitoring overhead on SDN controller 8. As one example, SDN controller 8 aggregates the information indicative of the traffic into buckets that are maintained in a database (e.g., syslog). SDN controller 8 compares the information to policy criteria to determine whether the policy is satisfied so that a tunnel is to be created. In this manner, the capturing of information of the traffic is done at the edge (e.g., spoke devices 10, rather than SDN controller 8) and can be summarized and filtered by spoke devices 10 and sent to SDN controller 8 to trigger dynamic creation of tunnel (e.g., SD-WAN secure path that bypasses one or more hub devices 6).

Moreover, in some examples, the IP addresses for spoke devices 10 may be deterministically generated so that spoke devices 10 can form the tunnels (e.g., update routing tables to route traffic that bypasses hub devices 6). Problem is that there are a large number (millions) of IP addresses that need to be management for the tunnels (GRE, IPSec). Each interface (e.g., spoke device 10) needs to have an IP address of a larger subnet, in some cases. IP addresses need to be properly deallocated. In one or more examples, the IP address management system is eliminated by encoding the IP encoding information in the link information. A unique termination point is generated based on the SITE ID and WAN interface. In this way, the IP address can be deterministically generated based on SITE ID and WAN interface. In some examples, the deterministic allocation of end-point IP address (e.g., spoke devices 10) may be done from a pre-determined pool. IP addresses between the two end points (e.g., spoke devices 10) are deterministically computed and dynamically assigned when the link and tunnel come up.

Figure 2:
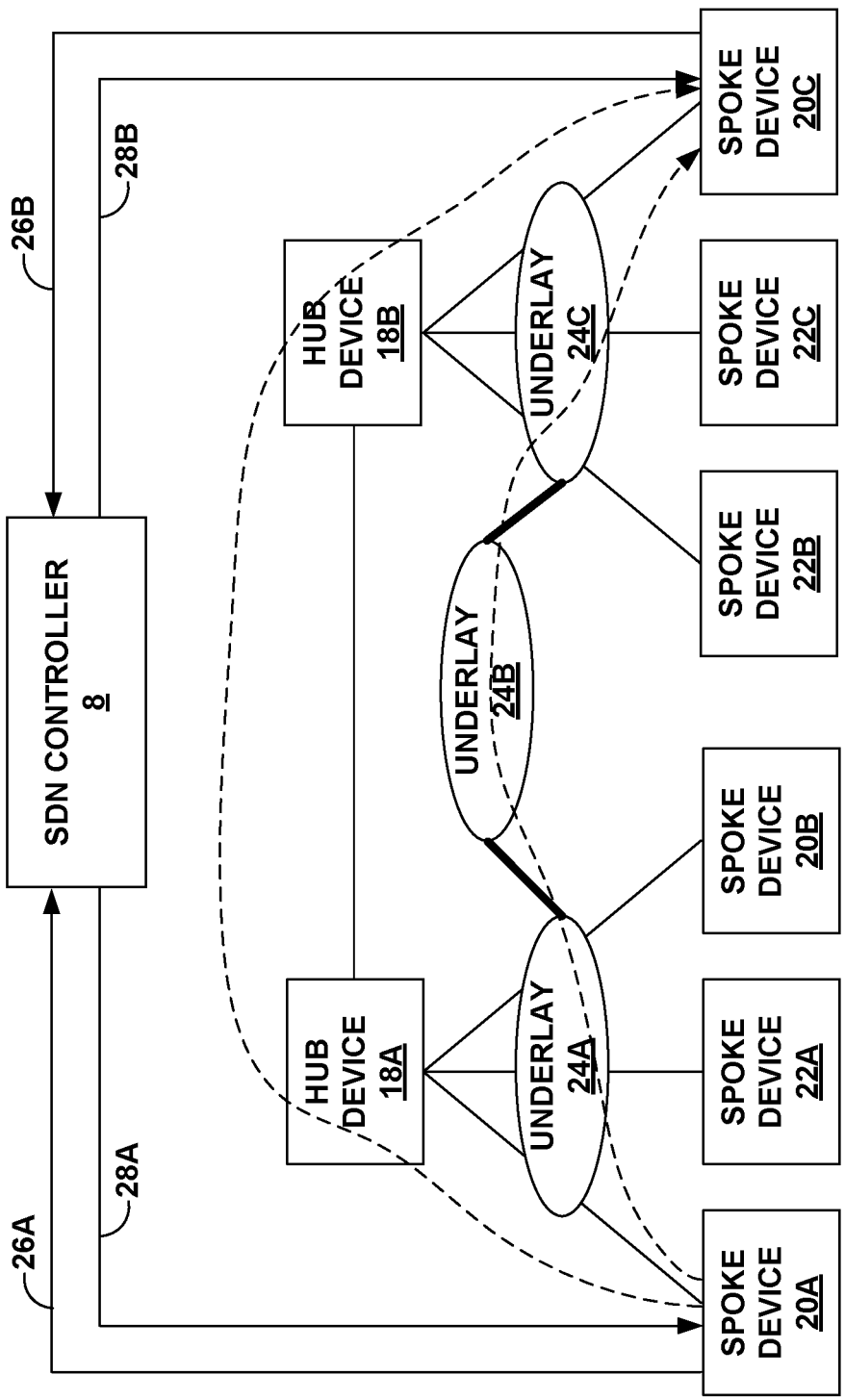
FIG. 2 is a block diagram illustrating another example network configured in a hub-and-spokes topology.

FIG. 2 is a block diagram illustrating another example network configured in a hub-and-spokes topology. For example, FIG. 2 depicts a flow of events in one example, non-limiting use case.

In FIG. 2, spoke devices 20A, 20B, and 20C are example spoke devices that form as a first mesh, and spoke devices 22A, 22B, and 22C are example spoke devices that form as a second mesh. As one example, spoke devices 20A, 20B, and 20C may be devices for a first enterprise, and spoke devices 22A, 22B, and 22C may be devices for a second, different enterprise. Based on policy criteria being satisfied, there may be possibility to form direct tunnels between devices 20 or between devices 22 but may be not between devices 20 and devices 22 since devices 20 and devices 22 are for different enterprises.

Examples of spoke devices 20 and 22 are like spoke devices 10, which may be NFX devices from Juniper®. Initially, spoke device 20A may communicate with spoke device 20C via hub device 18A and hub device 18B. However, SDN controller 8 may receive measurements that indicate that a tunnel should be configured from spoke device 20A to spoke device 20C. In turn, SDN controller 8 may form a tunnel between spoke device 20A and spoke device 20C through underlay 24A, 24B, and 24C, as illustrated. Underlay 24A, 24B, and 24C may be hardware components that form network 2 that SDN controller 8 may utilize to create a direct tunnel (e.g., shortcut tunnel) that bypasses hub devices 18A and 18B.

As illustrated, SDN controller 8 may collect information from paths 26A and 26B SDN controller 8 uses to determine whether the policy is satisfied to create a tunnel between device 20A and device 20C. SDN controller 8 may utilize paths 28A and 28B to instruct to device 20A and device 20C that a tunnel is configured for direct communication.

The following describes implementation examples. Three components are needed to implement the example techniques described in this disclosure for DVPN feature. Raw data collector which collects the session level data emitted by the devices and computes certain KPIs. Following KPIs are useful for DVPN feature—Session create/close rate, Throughput. These KPIs are computed for each site-pair based on the syslog data.

A Policy Definition and Enforcement Engine of SDN controller 8 may be used which can be used to define thresholds and other parameters (bucket size and bucket count, because KPI computation is continuous in time and a sliding window method is implemented for this reason). These policies can be defined at system level or alternatively for each tenant. Additionally, policies can also be extended to support KPI computation for specific set of applications only. Policy Enforcer module in SDN controller 8 periodically compares observed values of the KPI with configured value in the applicable policy and sends a create (or delete) notification to a Centralized Tunnel Controller of SDN controller 8 with information required to create/delete a tunnel.

Centralized Tunnel Controller of SDN controller 8 is used to create/delete tunnels. The tunnel controller receives the notification from Policy Enforcer and configures the site pair to create overlay tunnels and sets up the routing required to send traffic over the newly configured tunnel.

As described above, in some examples, rather than or in addition to SDN controller 8 monitoring traffic, it is possible that spoke devices 10, 20, or 22 monitor the traffic. In such examples, spoke devices 10, 20, and 22 may determine whether a policy is satisfied (e.g., more than 10 gigabytes have been transmitted, as per the above example). When the policy is satisfied, spoke devices 10, 20, and 22 may transmit to SDN controller 8 information indicative of the traffic (e.g., information indicative that more than 10 gigabytes of data has been transmitted), and in response SDN controller 8 may determine whether a dynamic tunnel is to be configured. In this way, the burden of monitoring all traffic by SDN controller 8 is reduced, and SDN controller 8 may determine whether to create or delete a tunnel based on information gathered by spoke devices 10, 20, and 22.

The following may be advantages over some other techniques, such as AD-VPN. Currently many routers have the capability to establish the IPSEC VPN tunnels upon a traffic discovery between the two sites. Though this approach may be used to create the tunnels dynamically between the two sites a controller-based policy driven approach discussed in this disclosure have several advantages than the existing device-initiated AD-VPN technologies.

Since the number of tunnels that can be established at a device is limited, controller 8 may provide priority to the sites and establish site-to-site tunnels to the sites which has higher priority. For fileservers, HQ sites where there is more important traffic can have dynamic tunnels created. Tunnel creation could be Application based (e.g., only when the certain types of traffic is initiated between the sites, e.g., voice). It is possible to learn the communication behavior pattern between the sites and dynamically bring up/down the tunnels between the sites.

In some examples, all SDN controller 8 managed devices send session logs to a centralized log collector (e.g., SDN controller 8) over a TCP connection, these logs are parsed and processed to extract relevant information (e.g. rx/tx bytes, packets etc.). Few such device logs are described that may be used to compute KPIs required for DVPN feature.

SDN controller 8 stores metric-counters for a fixed time-window (referred as buckets, e.g. 30 seconds). These Metric values for each bucket can be stored in a persistent TSDB (time-series database) or finite set of samples can be stored in-memory. DVPN feature may use following KPIs that are computed as described above.

The session close rate may have the following session Close log-<14>1 2018-05-02T09:13:43.888+05:30 pvsairam-1dut RT_FLOW-APPTRACK_SESSION_CLOSE [junos@2636.1.1.1.2.129 reason="CLI" source-address= "1.1.1.1" source-port="1541" destination-address= "15.15.15.2" destination-port="36000" service-name= "None" application="DTLS" nested-application= "UNKNOWN" nat-source-address="1.1.1.1" nat-source-port="1541" nat-destination-address="15.15.15.2" nat-destination-port="36000" src-nat-rule-name="N/A" dst-nat-rule-name="N/A" protocol-id="17" policy-name= "appqoe_policy" source-zone-name="lan" destination-zone-name="wan" session-id-32="5962" packets-from-client="2" bytes-from-client="284" packets-from-server="2" bytes-from-server="220" elapsed-time="65" username="N/A" roles="N/A" encrypted="No" profile-name="N/A" rule-name="N/A" routing-instance="ri1" destination-interface-name="gr-0/0/0.2" uplink-incoming-interface-name=" " uplink-tx-bytes="0" uplink-rx-bytes="0"].

From "Session Close" logs, rate of session creation between a pair of devices can be computed. Origin device is identified by the "host" present in whereas destination site is uniquely determined by a combination of "routing-instance" and "destination-ip".

Metric Key: HOSTNAME+ROUTING_INSTANCE+DESTINATION_IP

Metric Value: count of session close logs received during a time bucket

For session throughput, from "Session Close" logs, throughput (bytes transferred during session duration) between a pair of devices can be computed as Metric Key: HOSTNAME+ROUTING_INSTANCE+DESTINATION_IP Metric Value: Average throughput of each session during a time bucket For each session close log, SDN controller 8 determines the metric key as above and updates the metric-counter for current time bucket. As soon as current time bucket expires, a new one is added and subsequent metric-counter is stored in that bucket. These counters are not cumulative and reset to 0 when a new time bucket is added.

The following describes examples of policy definition and enforcement. DVPN feature makes use of KPIs defined above and used a policy to configure thresholds to generate tunnel create and delete triggers. DVPN policy is described as—

```
{
  'allowed_policies': {
    'dynamic_vpn_creation_policy': {
      'parameters': {
        'session_close_rate': {
          'threshold_per_sec': 100,
          'bucket_count': 5,
          'bucket_size_in_secs': 10
        }
      },
      'description': 'Policy to create an overlay tunnel when session close rate exceeds a configured threshold.',
      'condition': 'session_close_rate_exceeds_threshold'
    },
    'dynamic_vpn_deletion_policy': {
      'parameters': {
        'session_close_rate': {
          'threshold_per_sec': 50,
          'bucket_count': 10,
          'bucket_size_in_secs': 30
        }
      },
      'description': 'Policy to create an overlay tunnel when session close rate falls below a configured threshold.',
      'condition': 'session_close_rate_falls_below_threshold'
    }
  }
}
```

In order to determine whether a tunnel needs to be created between two devices, SDN controller 8 needs to compute these KPIs for the traffic between the device pair only if traffic is routed via hub. Conversely, to generate a delete trigger, SDN controller 8 needs to compute these KPIs for the traffic between a site pair over a direct tunnel. SDN controller 8 determines whether a traffic is routed via hub based on the value of "destination-interface-name".

KPIs defined earlier are computed for all application type traffic but it is possible to extend policy definition to allow filtering based on applications. These filters can be defined for both—create and delete triggers independently. Below is an example of a policy definition with "filters"—

```
{
  'allowed_policies': {
    'dynamic_vpn_creation_policy': {
      'parameters': {
        'session_close_rate': {
          'threshold_per_sec': 100,
          'bucket_count': 5,
          'bucket_size_in_secs': 10
        }
      },
      'filter': {
        'type': 'allowed_application',
        'applications': ['skype', 'lync', 'git'],
      }
    },
```

```
      'description': 'Policy to create an overlay tunnel when session close rate exceeds a configured threshold.',
      'condition': 'session_close_rate_exceeds_threshold'
    },
    'dynamic_vpn_deletion_policy': {
      'parameters': {
        'session_close_rate': {
          'threshold_per_sec': 50,
          'bucket_count': 10,
          'bucket_size_in_secs': 30
        },
        'filter': {
          'type': 'allowed_application',
          'applications': ['ftp', 'ssh'],
        }
      },
      'description': 'Policy to create an overlay tunnel when session close rate falls below a configured threshold.',
      'condition': 'session_close_rate_falls_below_threshold'
    }
  }
}
```

DVPN policies can be defined system wide or per tenant in order to support multi-tenanted cloud deployments. Each policy contains "tenant Id" to in the definition which is used by SDN controller 8 when policy is evaluated and enforced.

The following describes overlay tunnel creation or deletion triggers. This policy allows to CSO to observe traffic for a configurable period of time by configuring "bucket_size_in_secs" and "bucket_count". If observed KPI value exceeds configured value, then a following trigger is generate—

```
{
  "action": "CREATE",
  "destination_ip": "10.213.1.199",
  "vrf": "Default-reverse-appqoe1_DefaultVPN",
  "site": "9380c17b-8888-419b-ab45-f9cb93cffda8"
}
{
  "action": "DELETE",
  "destination_ip": "10.213.1.199",
  "vrf": "Default-reverse-appqoe1_DefaultVPN",
  "site": "9380c17b-8888-419b-ab45-f9cb93cffda8"
}
```

SDN controller 8 maintains the database reg. which site the destination IP address belongs to. Once it resolves the destination IP to the site in the mesh, SDN controller 8 initiates the VPN/Overlay connectivity (GRE/IPSEC) between the source site and destination site and pushes the required config on both the sites. Configuring IPSEC/VPN on the sites depends upon the device family.

As described above, SDN controller 8 may be configured to also determine unique identifiers for devices 10, and the IP addresses of devices 10 may be based on the unique identifiers. The following provides some additional description related to the unique identifiers and IP addresses.

Assume the number of sites (e.g., with devices 10) in a full mesh is n, and the maximum number of full mesh WAN links at a site are w. Accordingly, the total number of site-to-site overlay links, in sparse mode, may be w*(n*(n−1)/2), and total number of site-to-site overlay links, in dense mode, may be w*w*(n*(n−1)/2). Sparse mode is where each WAN link at a site is connected to only one wan-link in all other sites, and dense mode is where each WAN link at a site is connected to all possible WAN links in all other sites. In this case, for a full mesh topology with 500 sites and 3 WAN links each, in sparse mode, there would be 374,250 tunnels and in dense mode, there would be 1,122,750 tunnels. For every link there may be allocated a /31 subnet and both termination points (e.g., end points) correspond to one IP in this subnet. Also, this IP address should not be duplicated. In some examples, these IP addresses are allocated from a private range of IP addresses link 10.0.0.0/8.

Some techniques use an IP address management system, referred to as IPAM, which maintains two pools: free pool and allocated pool. IPAM allocates IP address from free pool and moves them to allocated, and when freed up, IPAM deallocates them and moves them back to free pool. However, such techniques may have issues. For example, to support parallel request, a lock is needed so that only a single request operates on the pool at any point of time. Also, the IPAM may need to deal with fragmentation in the IP addresses, and when a link/corresponding site is getting deleted, if the IP addresses are not freed, it may lead to IP address leaks.

This disclosure describes examples of encoding the link information into the IP address. For example, in the example IP encoding techniques, no IP address inventory is needed to be maintained (e.g., keeping of separate pools). In the encoding techniques, end points information is encoded into link subnet in such a way that it always generates a unique subnet for any link.

For example, for every site in the full mesh, a unique number is allocated, starting from zero. If any site is deleted, the site number is freed up and can be allocated to a new site. Every WAN link on the side is also identified by a unique number starting from zero. A link end point can be uniquely represented by the site number and WAN number. Given the private address range from which IP addresses are allocated, the end points are encoded in the remaining bits.

As an example, consider 10.0.0./8 IP address range form which /31 subnets are allocated. In this case, there are 24 bit to encode both the end points of link. The last bit (0/1) is reserved. One end point will get the 0, and the other end point will get the 1. The remaining bits (23) are divided into half, each one corresponds to one end point. Allocating the remaining bits slightly varies for dense mode and spare mode so that maximum possible links can be allocated.

For IP address allocation in dense mode, each WAN link at a site connects to all the WAN links present in every other site mesh. This requires both the end point information needs to be present in the IP address. The 23 bits are divided into two halves, and each end point will get 11 bits. Assume the maximum number of WAN links at any site in the mesh is two, then one bit is used to identify the WAN link and 10 bits for the site number. Thus, 1024 (e.g., $2^{10}$) IP addresses can be supported in dense mode. If the WAN links at site increases, then corresponding number of bits would need to be reserved.

For IP address allocation in sparse mode, each WAN link at site connects only to one WAN link in every other site in the mesh. It is enough to encoder WAN link information at source site. WAN link at destination site may not be needed because it is going to connect to only one link in the destination site. Accordingly, one bit is allocated to encode WAN link information, assuming maximum number of WAN links at a site is 2, and 11 bits can be used to encode each site numbers. Thus, 2048 (e.g., $2^{11}$) sites can be allocated in sparse mode. The example techniques described above may be applied to a full mesh or a hub-and-spoke topology.

Figure 3:
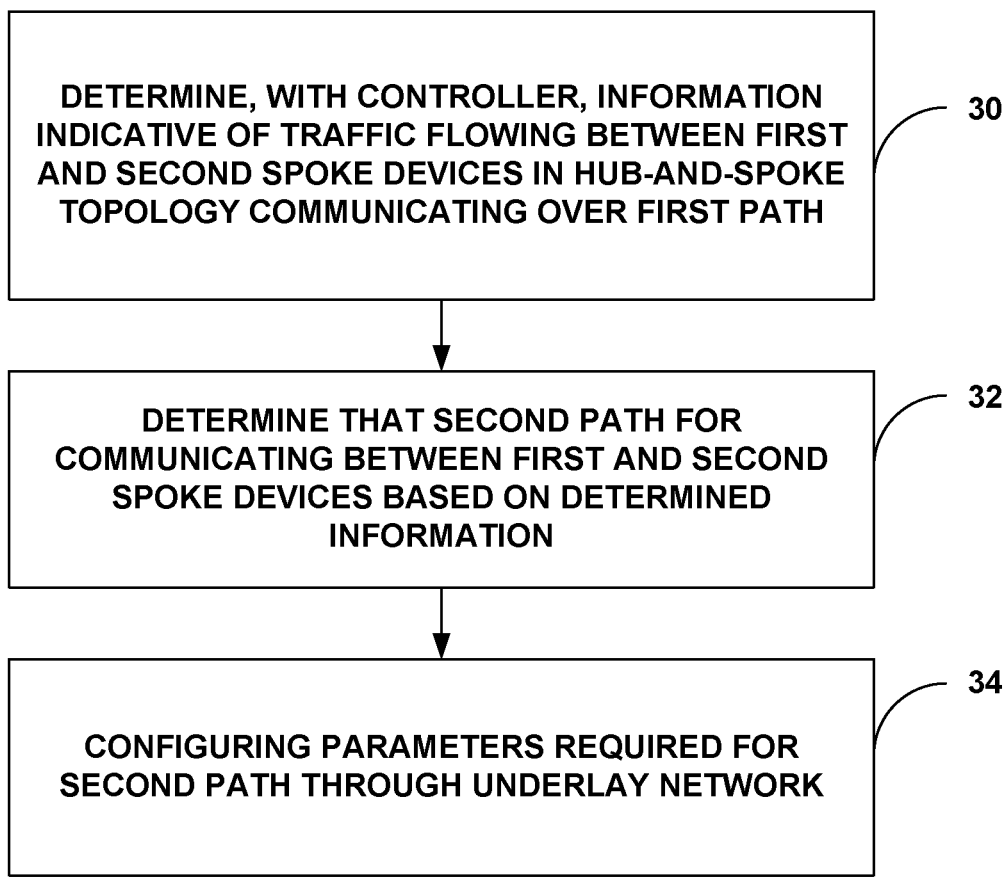
FIG. 3 is a flowchart illustrating an example method of operation in accordance with one or more example techniques described in this disclosure.

FIG. 3 is a flowchart illustrating an example method of operation in accordance with one or more example techniques described in this disclosure. For instance, the examples illustrated in FIG. 3 are for communicating in an SD-WAN arranged in a hub-and-spoke topology. In the hub-and-spoke topology, a plurality of spoke devices (e.g., spoke devices 10) are configured with an overlay tunnel (e.g., tunnels 14) to corresponding one of a plurality of hub devices (e.g., hub devices 6) such that a first spoke device (e.g., spoke device 10A) configured with a tunnel (e.g., tunnel 14A) to a first hub device (e.g., hub device 6A) communicates with a second spoke device (e.g., spoke device 10B) configured with a tunnel (e.g., tunnel 14B) to a second hub device (e.g., hub device 6B) via a first path (e.g., SD-WAN secure path like IPsec, but the techniques are not so limited) through the first hub device and the second hub device (e.g., tunnels 14A, 14B, and 14C).

In this hub-and-spoke topology, SDN controller 8 may determine information indicative of traffic flowing between the first and second spoke devices via the first path (30). As one example, SDN controller 8 may monitor the traffic between the first and second spoke devices.

As one example, rather than SDN controller 8 monitoring traffic, the monitoring may be pushed to the spoke devices (e.g., spoke devices 10). For example, at least one of the first or second spoke devices determine whether one or more policy metrics (e.g., as defined by SDN controller 8 and outputted to spoke devices 10) are satisfied (e.g., more than 10 gigabytes of data has been outputted, video traffic is being sent, etc. as examples of policy metrics). At least one of the first or second spoke devices determine information indicative of traffic flowing between the first and second spoke devices based on the determination of whether the one or more policy metrics are satisfied and transmit, to SDN controller 8, the determined information indicative of the traffic flowing between the first and second spoke devices. In such examples, to determine information indicative of traffic flowing between the first and second spoke devices via the first path, SDN controller 8 determines information indicative of traffic flowing between the first and second spoke devices via the first SD path based on the determined information received from at least one of the first and second spoke devices.

SDN controller 8 may determine that a second path (e.g., tunnel 16A) for communicating between the first spoke device and the second spoke device is to be configured based on the determined information (32). The second path bypasses at least one of the first hub device and the second hub device. As one example, SDN controller 8 may compare the determined information to a policy metric. SDN controller 8 may determine that the second path for communicating between the first spoke device and the second spoke device is to be configured based on the comparison.

SDN controller 8 may configure, in response to the determination, parameters required for the second path between the first spoke device and the second spoke device through the SD-WAN that bypasses at least one of the first hub device and the second hub device (34). For example, SDN controller 8 may output a unique identifier for the second spoke device to the first spoke device. The first spoke device may determine an Internet protocol (IP) address for the second spoke device based on the unique identifier and configure the second path based on the determined IP address. SDN controller 8 may be configured to determine the unique identifier for the second spoke device based at least in part on a site identification of the second spoke device and a WAN interface name.

Based on the parameters, at least one of the first or second spoke devices, configure the second path, although it is possible for SDN controller 8 to configure the second path.

In some examples, at least one of the first or second spoke device may update a routing table (e.g., based on the determined IP addresses) to router traffic through the second path. In such examples, the first and second spoke devices communicate based on the updated routing table to route data through the second path.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method of communicating in a software-defined wide area network (SD-WAN) configured in a hub-and-spoke topology, the method comprising:
   in the hub-and-spoke topology, where each of a plurality of spoke devices are configured with an overlay tunnel to a corresponding one of a plurality of hub devices such that a first spoke device configured with a tunnel to a first hub device communicates with a second spoke device configured with a tunnel to a second hub device via a first path through the first hub device and the second hub device, determining, with a software-defined networking (SDN) controller facilitating SD-WAN services across the SD-WAN, information indicative of traffic flowing between the first and second spoke devices via the first path;
   determining, with the SDN controller, that a second path for communicating between the first spoke device and the second spoke device is to be configured based on the determined information, wherein the second path bypasses both the first hub device and the second hub device; and
   configuring, with the SDN controller and in response to the determination, parameters required for the second path between the first spoke device and the second spoke device through the SD-WAN that bypasses both the first hub device and the second hub device.

2. The method of claim 1, wherein the SDN controller is configured to determine the information indicative of traffic flowing between the first and second spoke devices, and not route traffic between the first and second spoke devices.

3. The method of claim 1, further comprising:
   comparing the determined information to a policy metric, wherein determining that the second path for communicating between the first spoke device and the second spoke device is to be configured based on the determined information comprises determining that the second path for communicating between the first spoke device and the second spoke device is to be configured based on the comparison.

4. The method of claim 1, further comprising:
   determining, with at least one of the first or second spoke devices, whether one or more policy metrics are satisfied;
   determining, with at least one of the first or second spoke devices, information indicative of traffic flowing between the first and second spoke devices based on the determination of whether the one or more policy metrics are satisfied; and
   transmitting, with at least one of the first and second spoke devices to the SDN controller, the determined information indicative of the traffic flowing between the first and second spoke devices,
   wherein determining information indicative of traffic flowing between the first and second spoke devices via the first path comprises determining information indicative of traffic flowing between the first and second spoke devices via the first path based on the determined information received from at least one of the first and second spoke devices.

5. The method of claim 1, further comprising:
   configuring, with at least one of the first or second spoke devices, the second path.

6. The method of claim 1, wherein the second path traverses an underlay network of hardware components that form the SD-WAN.

7. The method of claim 1, wherein configuring parameters required for the second path between the first spoke device and the second spoke device through the SD-WAN that bypasses both the first hub device and the second hub device comprises outputting a unique identifier for the second spoke device to the first spoke device, the method further comprising:
   determining, with the first spoke device, an Internet protocol (IP) address for the second spoke device based on the unique identifier; and
   configuring, with the first spoke device, the second path based on the determined IP address.

8. The method of claim 7, further comprising:
   determining, with the SDN controller, the unique identifier for the second spoke device based at least in part on a site identification of the second spoke device and a WAN interface name.

9. A software-defined wide area network (SD-WAN) configured in a hub-and-spoke topology comprising:

a plurality of hub devices;
a plurality of spoke devices configured with an overlay tunnel to corresponding one of the plurality of hub devices such that a first spoke device configured with a tunnel to a first hub device communicates with a second spoke device configured with a tunnel to a second hub device via a first path through the first hub device and the second hub device; and
a software-defined networking (SDN) controller facilitating SD-WAN services across the SD-WAN, wherein the SDN controller is configured to:
determine information indicative of traffic flowing between the first and second spoke devices via the first path;
determine that a second path for communicating between the first spoke device and the second spoke device is to be configured based on the determined information, wherein the second path bypasses both the first hub device and the second hub device; and
configure, in response to the determination, parameters required for the second path between the first spoke device and the second spoke device through the SD-WAN that bypasses both the first hub device and the second hub device.

10. The SD-WAN of claim 9, wherein the SDN controller is configured to determine the information indicative of traffic flowing between the first and second spoke devices, and not route traffic between the first and second spoke devices.

11. The SD-WAN of claim 9, wherein the SDN controller is configured to:
compare the determined information to a policy metric,
wherein to determine that the second path for communicating between the first spoke device and the second spoke device is to be configured based on the determined information, the SDN controller is configured to determine that the second path for communicating between the first spoke device and the second spoke device is to be configured based on the comparison.

12. The SD-WAN of claim 9, wherein at least one of the first or second spoke devices is configured to:
determine whether one or more policy metrics are satisfied;
determine information indicative of traffic flowing between the first and second spoke devices based on the determination of whether the one or more policy metrics are satisfied; and
transmit, to the SDN controller, the determined information indicative of the traffic flowing between the first and second spoke devices,
wherein to determine information indicative of traffic flowing between the first and second spoke devices via the first path, the SDN controller is configured to determine information indicative of traffic flowing between the first and second spoke devices via the first path based on the determined information received from at least one of the first and second spoke devices.

13. The SD-WAN of claim 9, wherein at least one of the first or second spoke devices is configured to form the second path.

14. The SD-WAN of claim 9, wherein the second path traverses an underlay network of hardware components that form the SD-WAN.

15. The SD-WAN of claim 9, wherein to configure parameters required for the second path between the first spoke device and the second spoke device through the SD-WAN that bypasses both the first hub device and the second hub device, the SDN controller is configured to output a unique identifier for the second spoke device to the first spoke device, and
wherein the first spoke device is configured to:
determine an Internet protocol (IP) address for the second spoke device based on the unique identifier; and
configure the second path based on the determined IP address.

16. The SD-WAN of claim 15, wherein the SDN controller is configured to:
determine the unique identifier for the second spoke device based at least in part on a site identification of the second spoke device and a WAN interface name.

17. A service provider for a software-defined area network (SD-WAN) arranged in a hub-and-spoke topology, the service provider comprising:
a software-defined networking (SDN) controller communicatively coupled to a plurality of spoke devices in the hub-and-spoke topology, wherein the SDN controller is configured to facilitate SD-WAN services across the SD-WAN, wherein the plurality of spoke devices are configured with an overlay tunnel to a corresponding one of a plurality of hub devices such that a first spoke device configured with a tunnel to a first hub device communicates with a second spoke device configured with a tunnel to a second hub device via a first path through the first hub device and the second hub device, and
wherein the SDN controller is configured to:
determine information indicative of traffic flowing between the first and second spoke devices via the first path;
determine that a second path for communicating between the first spoke device and the second spoke device is to be configured based on the determined information, wherein the second path bypasses both the first hub device and the second hub device; and
configure, in response to the determination, parameters required for the second path between the first spoke device and the second spoke device through the SD-WAN that bypasses both the first hub device and the second hub device.

18. The service provider of claim 17, wherein the SDN controller is configured to determine the information indicative of traffic flowing between the first and second spoke devices, and not route traffic between the first and second spoke devices.

19. The service provider of claim 17, wherein the SDN controller is configured to:
compare the determined information to a policy metric,
wherein to determine that the second path for communicating between the first spoke device and the second spoke device is to be configured based on the determined information, the SDN controller is configured to determine that the second path for communicating between the first spoke device and the second spoke device is to be configured based on the comparison.

20. The service provider of claim 17, wherein to configure parameters required for the second path between the first spoke device and the second spoke device through the SD-WAN that bypasses both the first hub device and the second hub device, the SDN controller is configured to output a unique identifier for the second spoke device to the first spoke device.

* * * * *